United States Patent
Ishiguro et al.

(10) Patent No.: US 12,506,221 B2
(45) Date of Patent: Dec. 23, 2025

(54) NON-WOVEN FABRIC, METHOD OF MANUFACTURING NON-WOVEN FABRIC, SOLID ELECTROLYTE MEMBRANE, METHOD OF MANUFACTURING SOLID ELECTROLYTE MEMBRANE, ALL-SOLID-STATE BATTERY, AND METHOD OF MANUFACTURING ALL-SOLID-STATE BATTERY

(71) Applicants: THE JAPAN STEEL WORKS, LTD., Tokyo (JP); NATIONAL UNIVERSITY CORPORATION KYOTO INSTITUTE OF TECHNOLOGY, Kyoto (JP)

(72) Inventors: Ryo Ishiguro, Tokyo (JP); Satoru Nakamura, Tokyo (JP); Midori Takasaki, Kyoto (JP); Sotaro Nambu, Kyoto (JP); Kazuki Matsumoto, Kyoto (JP); Norio Tsujioka, Kyoto (JP)

(73) Assignees: THE JAPAN STEEL WORKS, LTD., Tokyo (JP); NATIONAL UNIVERSITY CORPORATION KYOTO INSTITUTE OF TECHNOLOGY, Kyoto (JP)

( * ) Notice: Subject to any disclaimer, the term of this patent is extended or adjusted under 35 U.S.C. 154(b) by 715 days.

(21) Appl. No.: 17/594,611

(22) PCT Filed: Apr. 23, 2020

(86) PCT No.: PCT/JP2020/017491
§ 371 (c)(1),
(2) Date: Oct. 24, 2021

(87) PCT Pub. No.: WO2020/218417
PCT Pub. Date: Oct. 29, 2020

(65) Prior Publication Data
US 2022/0247035 A1    Aug. 4, 2022

(30) Foreign Application Priority Data

Apr. 25, 2019   (JP) .................. 2019-084028

(51) Int. Cl.
*H01M 50/44*   (2021.01)
*D04H 1/04*    (2012.01)
(Continued)

(52) U.S. Cl.
CPC .............. *H01M 50/44* (2021.01); *D04H 1/04* (2013.01); *D04H 1/728* (2013.01);
(Continued)

(58) Field of Classification Search
CPC .. H01M 50/414; H01M 50/44; H01M 50/446; H01M 50/4295; H01M 10/525;
(Continued)

(56) References Cited

U.S. PATENT DOCUMENTS 6,288,144 B1    9/2001  Roberts et al.
2011/0275520 A1  11/2011  Frey et al.
(Continued)

FOREIGN PATENT DOCUMENTS

CN   108884595 A   11/2018
CN   109119683 A    1/2019
(Continued)

OTHER PUBLICATIONS

JP-2017103146-A English machine translation (Year: 2024).*
(Continued)

*Primary Examiner* — Armindo Carvalho, Jr.
(74) *Attorney, Agent, or Firm* — Potomac Law Group, PLLC

(57) ABSTRACT

A solid electrolyte membrane having favorable characteristics and a method of forming the same are provided. A solid electrolyte membrane 40 is composed of a non-woven fabric
(Continued)

(ultrafine fiber non-woven fabric) UFN and solid electrolyte particles 4AP incorporated therein. Also, the non-woven fabric UFN includes a fiber (ultrafine fiber UF) made of a resin containing a polar filler. A method of manufacturing the solid electrolyte membrane 40 includes a step of preparing the non-woven fabric UFN including a fiber made of a resin containing a polar filler, a step of applying a slurry S containing the solid electrolyte particles 4AP onto the non-woven fabric UFN, and a step of heating while pressurizing the slurry S on the non-woven fabric UFN. Further, the non-woven fabric UFN is formed by making the resin containing the polar filler be a fibrous form by a laser electrospinning method.

2 Claims, 7 Drawing Sheets

(51) Int. Cl.
  *D04H 1/728*    (2012.01)
  *H01M 10/0525*  (2010.01)
  *H01M 10/0562*  (2010.01)
  *H01M 10/058*   (2010.01)
  *H01M 50/414*   (2021.01)
  *H01M 50/429*   (2021.01)
  *H01M 50/446*   (2021.01)

(52) U.S. Cl.
  CPC ... *H01M 10/0525* (2013.01); *H01M 10/0562* (2013.01); *H01M 10/058* (2013.01); *H01M 50/414* (2021.01); *H01M 50/4295* (2021.01); *H01M 50/446* (2021.01); *D10B 2201/20* (2013.01); *H01M 2300/0068* (2013.01)

(58) Field of Classification Search
  CPC ............. H01M 10/562; H01M 10/058; H01M 2300/0068; D04H 1/04; D04H 1/728; D01B 220/20; D01B 2201/20
  See application file for complete search history.

(56) References Cited

U.S. PATENT DOCUMENTS

| | | | |
|---|---|---|---|
| 2013/0085212 A1 | 4/2013 | Lagaron Cabello et al. | |
| 2014/0121307 A1 | 5/2014 | Cao et al. | |
| 2014/0227605 A1 | 8/2014 | Nakamura et al. | |
| 2015/0372269 A1* | 12/2015 | Sato .................. | H01M 10/0525 429/249 |
| 2017/0298535 A1 | 10/2017 | Tei et al. | |
| 2018/0375148 A1 | 12/2018 | Yersak et al. | |
| 2019/0237731 A1* | 8/2019 | Park .................... | H01M 50/457 |
| 2019/0288332 A1 | 9/2019 | Hotta et al. | |
| 2019/0322538 A1* | 10/2019 | Liu ........................ | C01B 39/38 |
| 2019/0372149 A1 | 12/2019 | Cho et al. | |

FOREIGN PATENT DOCUMENTS

| | | |
|---|---|---|
| CN | 109244327 A | 1/2019 |
| JP | H07-335216 A | 12/1995 |
| JP | H07-335217 A | 12/1995 |
| JP | H07-335218 A | 12/1995 |
| JP | 2007-262644 A | 10/2007 |
| JP | 2009-299212 A | 12/2009 |
| JP | 2010-250982 A | 11/2010 |
| JP | 2011-216269 A | 10/2011 |
| JP | 2013-127982 A | 6/2013 |
| JP | 2014-143006 A | 8/2014 |
| JP | 2017103146 A * | 6/2017 |
| JP | 2017-157307 A | 9/2017 |
| JP | 2017-183111 A | 10/2017 |
| JP | 2018-101641 A | 6/2018 |
| JP | 2018-204140 A | 12/2018 |
| JP | 2019-160748 A | 9/2019 |
| KR | 10-1617964 B1 | 5/2016 |
| KR | 10-2017-0074857 A | 6/2017 |
| KR | 10-2018-0125407 A | 11/2018 |
| WO | WO 2018/212568 A1 | 11/2018 |
| WO | WO 2019/065066 A1 | 4/2019 |
| WO | WO 2019/208347 A1 | 10/2019 |

OTHER PUBLICATIONS

Office Action issued Mar. 28, 2023, in Japanese Patent Application No. 2019-084028.
Office Action issued Nov. 22, 2022, in Chinese Patent Application No. 202080030573.2.
Office Action issued Jun. 1, 2023, in Chinese Patent Application No. 202080030573.2.
Office Action issued Mar. 6, 2024, in Chinese Patent Application No. 202080030573.2.
Office Action issued May 3, 2024, in Taiwanese Patent Application No. 109113634.
International Search Report from International Patent Application No. PCT/JP2020/017501, Jul. 28, 2020.
Office Action issued Aug. 8, 2023, in Chinese Patent Application No. 202080030604.4.
Office Action issued Aug. 14, 2023, in Indian Patent Application No. 202117048298.
Office Action issued Jun. 6, 2023, in Japanese Patent Application No. 2019-085279.
Office Action issued Nov. 29, 2023, in U.S. Appl. No. 17/594,650.
Office Action issued May 3, 2024, in Taiwanese Patent Application No. 109113635.
International Search Report from International Patent Application No. PCT/JP2020/017491, Jul. 28, 2020.
Piyaporn Kampeerapappun: "The electrospun polyhydroxybutyrate fibers reinforced with cellulose nanocrystals: Morphology and properties", Journal of Applied Polymer Science, vol. 133, No. 20, Feb. 3, 2016 (Feb. 3, 2016), ), pp. n/a-n/a, XP55254431, ISSN: 0021-8995, DOI: 10.1002/app.43273.
Extended European search report issued Dec. 16, 2022, in European Patent Application No. 20794655.9.
Office Action issued Sep. 28, 2023, in Chinese Patent Application No. 202080030573.2.
Extended European Search Report and European Search Opinion issued Nov. 21, 2024, in European Patent Application No. 20794341.6.
Office Action issued Mar. 11, 2025, in Korean Patent Application No. 10-2021-7036943.
Office Action issued Jun. 17, 2025, in Korean Patent Application No. 10-2021-7036941.
Office Action issued Sep. 26, 2025, in Indian Patent Application No. 202117048283.

* cited by examiner (a)

(b)

(c)

(a)

(b)

(c)

(a)

(b)

(c)

NON-WOVEN FABRIC, METHOD OF MANUFACTURING NON-WOVEN FABRIC, SOLID ELECTROLYTE MEMBRANE, METHOD OF MANUFACTURING SOLID ELECTROLYTE MEMBRANE, ALL-SOLID-STATE BATTERY, AND METHOD OF MANUFACTURING ALL-SOLID-STATE BATTERY

TECHNICAL FIELD

The present invention relates to a non-woven fabric, a method of manufacturing a non-woven fabric, a solid electrolyte membrane, a method of manufacturing a solid electrolyte membrane, an all-solid-state battery, and a method of manufacturing an all-solid-state battery.

BACKGROUND ART

Secondary batteries have been developed in the order of lead batteries, nickel-cadmium batteries, nickel metal hydride batteries (Ni-MH batteries), and lithium batteries (LIB) in broad terms. As for the usage thereof, the demand as the power source for mobile phones, notebook computers, and especially electric vehicles (EV) has been rapidly expanding. Among them, LIB is the mainstream of the secondary battery because it has many advantages such as high energy density, high charge/discharge energy, and compact packaging as compared with other secondary batteries. It is known that the LIB has at least three layers of a positive electrode, a separator, and a negative electrode, and is formed to have a structure in which these three layers are covered with an electrolyte. An organic solvent, which is a flammable substance, is generally used as the electrolyte, but recently, an all-solid-state battery has been attracting attention in order to develop a battery with higher safety. In the all-solid-state battery, a flammable organic electrolytic solution is replaced with a non-flammable inorganic solid electrolyte or the like, and its safety is improved as compared with the conventional batteries. Also, in such an all-solid-state battery, further improvement is expected in terms of battery performance, and for example, higher energy density of the battery is expected.

For example, Patent Document 1 (Japanese Unexamined Patent Application Publication No. 2010-250982) discloses a sheet for solid electrolyte obtained by molding the powder containing solid electrolyte glass particles containing Li, P, and S, wherein the standard deviations of the area ratios of the peaks obtained by the waveform separation of the peak present between 330 $cm^{-1}$ to 450 $cm^{-1}$ of the Raman spectrum measured repeatedly for the glass particles are all less than 4.0.

Also, Patent Document 2 (Japanese Unexamined Patent Application Publication No. 2017-103146) discloses a technology related to a solid electrolyte sheet and a method of manufacturing the same that can give excellent energy density and output characteristics to an all-solid-state battery and make it possible to produce a large number of all-solid-state batteries by the continuous process. Specifically, the solid electrolyte sheet includes a solid electrolyte and a support, the support has a plurality of through holes, and the solid electrolyte is filled in the through holes. The method of manufacturing the solid electrolyte sheet includes a step of filling a plurality of through holes formed on the support with the solid electrolyte, and a step of pressing the support in which the through holes are filled with the solid electrolyte.

Further, Patent Document 3 (Japanese Unexamined Patent Application Publication No. 2018-204140) discloses a technology for fabricating a PET fiber web by the laser electrospinning (LES) method.

RELATED ART DOCUMENTS

Patent Documents

Patent Document 1: Japanese Unexamined Patent Application Publication No. 2010-250982

Patent Document 2: Japanese Unexamined Patent Application Publication No. 2017-103146

Patent Document 3: Japanese Unexamined Patent Application Publication No. 2018-204140

SUMMARY OF THE INVENTION

Problems to be Solved by the Invention

In the all-solid-state battery in Patent Document 1, for example, the solid electrolyte glass particle powder containing elements such as Li and others is molded to form a sheet, and this sheet is applied to a solid electrolyte. However, since the electrical conduction in the solid electrolyte formed only of the powder material is made by the contact between powders, the contact area becomes small and the output characteristics tend to be inferior to those of the lithium battery using the electrolytic solution. Further, when a powder material is used, it is difficult to form a thin film sheet composed of a layer made of a single material, and the manufacturing process tends to be complicated.

On the other hand, in Patent Document 2 mentioned above, the solid electrolyte sheet (thickness: 37 to 138 μm) is manufactured by filling a plurality of through holes having a square shape with a side of 200 to 800 μm, which is formed by a photo-etching method in a polyimide sheet-like support (opening ratio: 50 to 99%), with a solid electrolyte, and then performing the heating and pressurizing process with a press machine. However, in this case, since a wet etching method using a chromium-based solvent is used when penetrating the polyimide sheet serving as a support, a harmful organic solvent is used, which poses serious cost and environmental problems. In addition, since the size of the opening is large and the specific gravity of the solid electrolyte is large, the solid electrolyte may gradually fall off from the sheet support in the case of binderless, and the durability tends to below. Furthermore, since the solid electrolyte layer is thick, the resistance between electrodes becomes high.

From the above, the inventors have reached the knowledge that a high-strength, high-heat-resistant nanofiber non-woven fabric having a small thickness and fine porosity is suitable as a support of a solid electrolyte powder in order to obtain a better solid electrolyte membrane, and have found out the favorable solid electrolyte membrane, method of manufacturing the solid electrolyte membrane, all-solid-state battery, and method of manufacturing the all-solid-state battery as a result of the diligent studies by applying the laser electrospinning (LES) technology (Patent Document 3) developed by the inventors.

The other problems and novel features will be apparent from the description of this specification and the accompanying drawings.

Means for Solving the Problems

An outline of a typical embodiment disclosed in this application will be briefly described as follows.

A solid electrolyte membrane described in an embodiment disclosed in this application is a solid electrolyte membrane for an all-solid-state battery and includes a non-woven fabric and solid electrolyte particles incorporated in the non-woven fabric, and the non-woven fabric includes a fiber made of a resin containing a polar filler.

A method of manufacturing a solid electrolyte membrane described in an embodiment disclosed in this application is a method of manufacturing a solid electrolyte membrane for an all-solid-state battery and includes: (a) a step of preparing a non-woven fabric including a fiber made of a resin containing a polar filler; (b) a step of applying a slurry containing solid electrolyte particles onto the non-woven fabric; (c) a step of drying the slurry on the non-woven fabric; and (d) a step of pressurizing the slurry on the non-woven fabric.

An all-solid-state battery described in an embodiment disclosed in this application is an all-solid-state battery having a positive electrode, a negative electrode, and a solid electrolyte membrane, and the solid electrolyte membrane is arranged between the positive electrode and the negative electrode and includes a non-woven fabric and solid electrolyte particles incorporated in the non-woven fabric, and the non-woven fabric includes a fiber made of a resin containing a polar filler.

A method of manufacturing an all-solid-state battery described in an embodiment disclosed in this application includes: (a) a step of forming a solid electrolyte membrane; (b) a step of forming a positive electrode mixture layer including a positive electrode active material on a first surface of the solid electrolyte membrane; and (c) a step of forming a negative electrode mixture layer including a negative electrode active material on a second surface of the solid electrolyte membrane. Also, the step (a) includes: (a1) a step of preparing a non-woven fabric including a fiber made of a resin containing a polar filler; (a2) a step of applying a slurry containing solid electrolyte particles onto the non-woven fabric; (a3) a step of drying the slurry on the non-woven fabric; and (a4) a step of pressurizing the slurry on the non-woven fabric.

Effects of the Invention

According to the non-woven fabric and the method of manufacturing the non-woven fabric described in the typical embodiment disclosed in this application, it is possible to improve the characteristics of the non-woven fabric. Also, according to the solid electrolyte membrane described in the typical embodiment disclosed in this application, it is possible to improve the characteristics of the solid electrolyte membrane. Further, by using the solid electrolyte membrane described in the typical embodiment disclosed in this application, it is possible to improve the characteristics of the all-solid-state battery. Also, according to the method of manufacturing the solid electrolyte membrane described in the typical embodiment disclosed in this application, it is possible to manufacture the solid electrolyte membrane having favorable characteristics. Further, according to the method of manufacturing the all-solid-state battery described in the typical embodiment disclosed in this application, it is possible to manufacture the all-solid-state battery having favorable characteristics.

BRIEF DESCRIPTIONS OF THE DRAWINGS

DETAILED DESCRIPTION OF PREFERRED EMBODIMENTS

Embodiment

Hereinafter, an embodiment of the present invention will be described in detail with reference to drawings.

[Configuration of all-Solid-State Battery]

Figure 1:
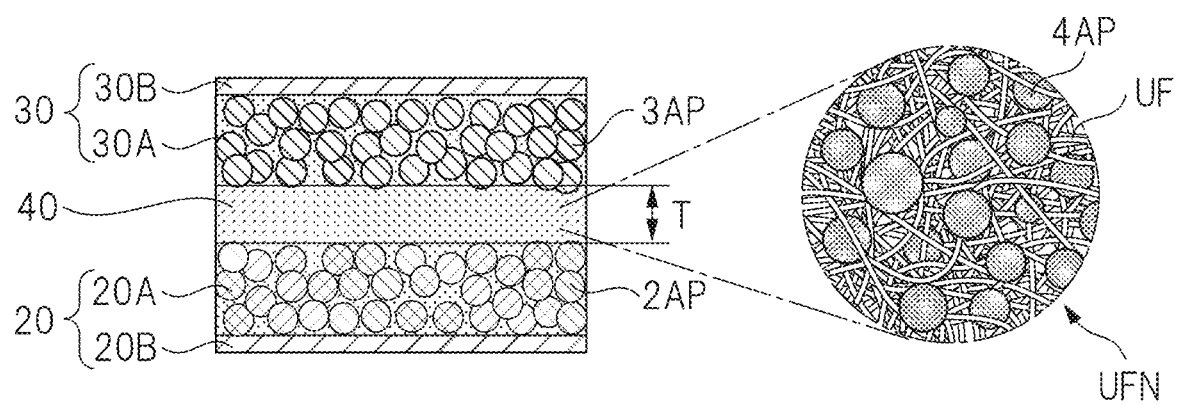
FIG. 1 is a cross-sectional view schematically showing a configuration of an all-solid-state battery according to an embodiment.

FIG. 1 is a cross-sectional view schematically showing a configuration of an all-solid-state battery according to an embodiment. This all-solid-state battery (also referred to as solid battery) is a lithium ion secondary battery.

As shown in FIG. 1, the lithium ion secondary battery according to the present embodiment includes a negative electrode 20, a positive electrode 30, and a solid electrolyte membrane (solid electrolyte layer) 40 arranged therebetween.

The negative electrode 20 has a negative electrode mixture layer 20A and a negative electrode current collector 20B. The negative electrode mixture layer 20A has a negative electrode active material 2AP and a solid electrolyte material (solid electrolyte material for negative electrode). Further, the negative electrode mixture layer 20A may have a negative electrode conductive assistant, a negative electrode binder, and the like. The negative electrode current collector 20B is made of, for example, metal foil (for example, copper foil).

As the negative electrode active material 2AP, a material capable of occluding and releasing lithium, for example, graphite (natural graphite, artificial graphite, etc.) can be used. The negative electrode active material 2AP is granular.

The positive electrode 30 has a positive electrode mixture layer 30A and a positive electrode current collector 30B. The positive electrode mixture layer 30A has a positive electrode active material 3AP and a solid electrolyte material (solid electrolyte material for positive electrode). Further, the positive electrode mixture layer 30A may have a positive electrode conductive assistant, a positive electrode binder, and the like. The positive electrode current collector 30B is made of, for example, metal foil (for example, aluminum foil).

As the positive electrode active material 3AP, a material capable of occluding and releasing lithium, for example, an oxide containing lithium ($LiCoO_2$, $LiNiO_2$, $LiMnO_2$, etc.) can be used. The positive electrode active material 3AP is granular.

The solid electrolyte membrane 40 is made of a solid electrolyte material. As the solid electrolyte material, a material having Li ion conductivity can be used. The solid electrolyte material is granular.

As the solid electrolyte material, a sulfide-based solid electrolyte or an oxide-based solid electrolyte can be used.

As the sulfide-based solid electrolyte, for example, a sulfide containing Li and P can be used. Specifically, $Li_2S$—$SiS_2$, $Li_2S$—$P_2S_5$, $Li_2S$—$GeS_2$, $Li_2S$—$B_2S_3$, $Li_2S$—$Ga_2S_3$, $Li_2S$—$Al_2S_3$, $Li_2S$—$GeS_2$—$P_2S_5$, $Li_2S$—$Al_2S_3$—$P_2S_5$, $Li_2S$—$P_2S_3$, $Li_2S$—$P_2S_3$—$P_2S_5$, LiX—$Li_2S$—$P_2S_5$, LiX—$Li_2S$—$SiS_2$, LiX—$Li_2S$—$B_2S_3$ (X: I, Br, Cl, or I), and the like can be presented.

As the oxide-based solid electrolyte, for example, an oxide containing Li can be used. Specifically, $La_{0.51}Li_{0.34}TiO_{2.94}$, $Li_{1.3}Al_{0.3}Ti_{1.7}(PO_4)_3$, $Li_7La_3Zr_2O_{12}$, $Li_{2.9}PO_{3.3}N_{0.46}$, $Li_{3.6}Si_{0.6}P_{0.4}O_4$, $Li_{1.5}Al_{0.5}Ge_{1.5}(PO_4)_3$, and the like can be presented.

As the solid electrolyte, one type may be used alone, or two or more types may be used in combination as needed. Also, the solid electrolytes included in the positive electrode and the negative electrode may be of the same or different types.

Here, in the present embodiment, the solid electrolyte membrane 40 includes an ultrafine fiber non-woven fabric UFN and a solid electrolyte material (solid electrolyte particles 4AP). Specifically, the solid electrolyte particles 4AP are incorporated in the ultrafine fiber non-woven fabric UFN used as a support (see the circular portion in FIG. 1, FIG. 2, and FIG. 10(a)). In other words, the solid electrolyte particles 4AP are embedded in the fine pores of the ultrafine fiber non-woven fabric UFN, or the solid electrolyte particles 4AP are filled in the fine pores of the ultrafine fiber non-woven fabric UFN.

The ultrafine fiber non-woven fabric UFN can be formed by the laser electrospinning (LES) method as described later. The ultrafine fiber non-woven fabric UFN has a configuration in which ultrafine fibers UF are mutually entwined to be laminated. Also, there are fine pores (fine holes, fine through holes) between the ultrafine fibers UF. As described above, the ultrafine fiber non-woven fabric UFN is microporous. By using the ultrafine fibers UF having a small fiber diameter and high uniformity, the pore diameter becomes finer and the variation thereof becomes smaller.

Therefore, the characteristics of the solid electrolyte membrane 40 can be improved by using the configuration in which the solid electrolyte material (particles) is incorporated in the ultrafine fiber non-woven fabric UFN used as a support as described above. Specifically, by supporting (fixing) the solid electrolyte material, which is fine particles, with the ultrafine fiber UF, the ratio of the solid electrolyte material in the solid electrolyte membrane 40 can be increased, and the occupied area (exposed area) of the solid electrolyte material on the surface of the membrane can be increased. As a result, the contact area between the solid electrolyte membrane 40 and the positive and negative electrodes (positive and negative electrode active materials) can be improved, so that the characteristics (output characteristics, charge/discharge characteristics) of the all-solid-state battery can be improved. Also, by supporting (fixing) the solid electrolyte material, which is fine particles, with the ultrafine fiber UF, the film thickness of the solid electrolyte membrane 40 can be reduced, the resistance between the positive electrode and the negative electrode can be reduced, and the characteristics (output characteristics, charge/discharge characteristics) of the all-solid-state battery can be improved.

In addition, by supporting (fixing) the solid electrolyte material, which is fine particles, with the ultrafine fiber UF, the solid electrolyte material can be firmly fixed, and the solid electrolyte material can be prevented from falling off or collapsing. Further, it is also possible to increase the strength of the solid electrolyte membrane.

Next, the manufacturing process of the solid electrolyte membrane will be described, and the configuration of the solid electrolyte membrane will be described in more detail.

[Method of Fabricating Solid Electrolyte Membrane]

<Method of Fabricating Ultrafine Fiber Non-Woven Fabric>

In the laser electrospinning (LES) method, ultrafine fibers are fabricated by instantaneously and uniformly heating and melting a fibrous raw material (raw material resin) by irradiating a laser beam in a state of applying a high voltage (for example, about 11 to 24 kV) to a nozzle while sending out the fibrous raw material at a constant speed, and then stretching the material by electrostatic force. As the characteristics of the LES method, since the material is heated by the laser beam, the heating time is short and the thermal decomposition can be suppressed as much as possible. Also, since the material is stretched by electrostatic force, the application concentration is less likely to occur and the stable fiber spinning is possible.

Figure 5:
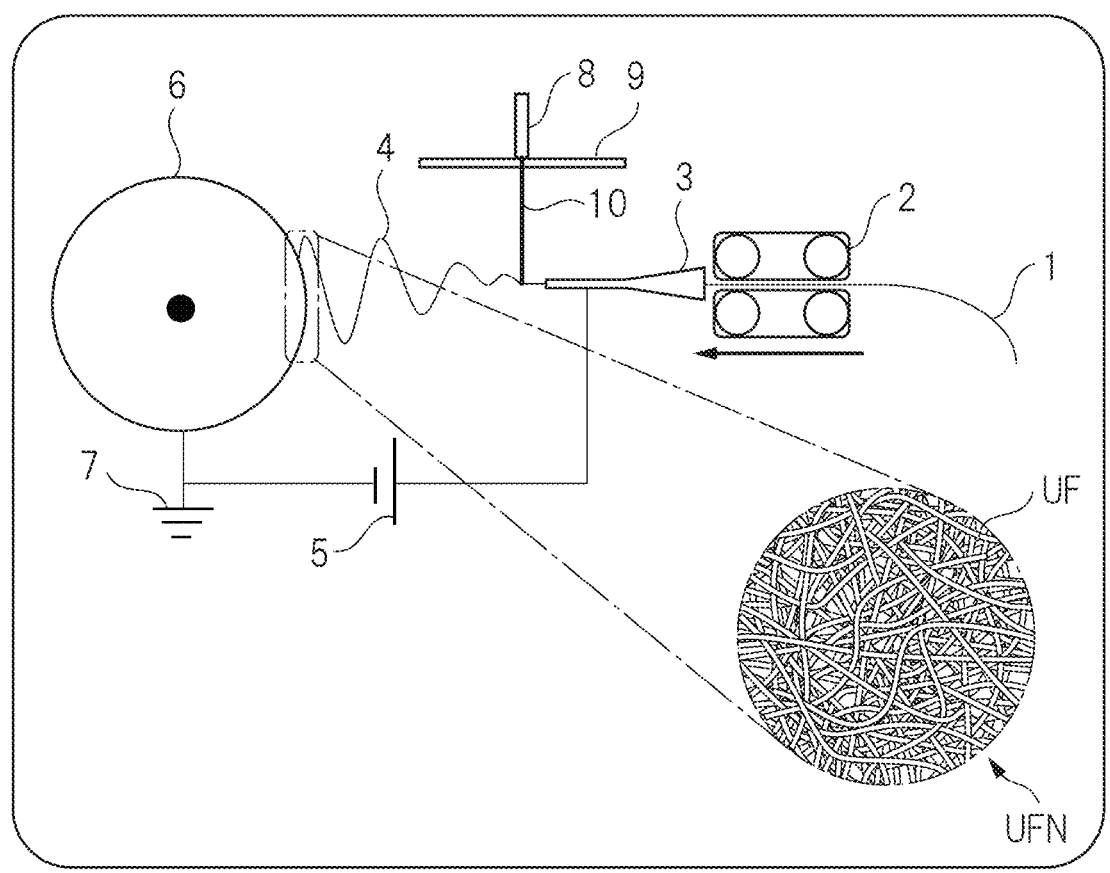
FIG. 5 is a schematic diagram showing a configuration of a laser electrospinning apparatus.

FIG. 5 is a schematic diagram showing a configuration of a laser electrospinning apparatus. As shown in FIG. 5, the laser electrospinning apparatus includes a nozzle 3 that sends out a raw material resin, a laser irradiation unit 8 that irradiates a tip of the nozzle 3 with a laser ($CO_2$ laser) 10, and a collector (fiber collecting unit) 6 that stretches the fibers discharged from the nozzle 3 by electrostatic force. A high voltage is applied between the collector 6 and the nozzle 3 by a high voltage generation source 5, and the collector 6 is connected to a ground potential 7. The laser irradiation unit 8 irradiates the tip of the nozzle 3 with the laser 10 through a slit 9. A thread-like resin (raw material resin) 1 as a raw material is supplied to the nozzle 3 through a roller 2.

When the raw material resin 1 extruded from the nozzle 3 is irradiated with the laser 10 in the state of applying a high voltage between the nozzle 3 and the collector 6 by the high voltage generation source 5, the raw material resin 1 is instantaneously and uniformly heated and melted, stretched by electrostatic force to become the ultrafine fiber UF, and collected on the collector 6. The non-woven fabric (fiber web) UFN can be obtained by laminating the ultrafine fibers UF while being entwined with each other.

As the raw material resin, a thermoplastic resin can be used. For example, a thermoplastic resin which has a softening temperature of 100° C. or higher and is insoluble in an organic solvent (for example, xylene) at 20° C. can be used. The softening temperature is a temperature at which the thermoplastic material starts to soften rapidly, and can be measured by a method based on "Thermoplastic materials—Determination of Vicat softening temperature (VST)" (JIS K 7206). Specific examples of the raw material resin include polyolefins such as polyethylene, high-density polyethylene, polypropylene, and polymethylpentene, polyesters such as polyethylene terephthalate (PET) and polybutylene terephthalate (PBT), polyvinylidene fluoride (PVDF), polyamide, and polyphenylene sulfide. It is preferable to use polyethylene, high-density polyethylene, or polypropylene as the raw material resin. In particular, by using high-density polyethylene (HDPE), the ultrafine fiber non-woven fabric having high strength and high heat resistance can be formed. Further, although polypropylene tends to have a slightly slower crystallization rate than polyethylene, polypropylene can be preferably used as a raw material resin because crystallization is promoted by the function of the nucleating agent of cellulose nanofiber (CeNF) described later.

Here, in the present embodiment, cellulose nanofiber (CeNF) is added to the raw material resin. By adding CeNF, the ultrafine fibers become finer and more uniform. It is conceivable that this is because the addition of CeNF to the raw material resin increases the stretching effect by the electrostatic force and promotes the fibers to be ultrafine. The fiber diameter (average fiber diameter) of the ultrafine fiber to which CeNF is added is 10 μm or less, preferably 5 μm or less, and more preferably 1 μm or less. The amount of CeNF added to the raw material resin is, for example, 0.1 vol % or more and 10 vol % or less. On the other hand, the fiber diameter (average fiber diameter) of the fiber to which CeNF is not added is about a dozen μm.

CeNF is fine powdered cellulose. Cellulose (Cell-OH) is a carbohydrate represented by $(C_6H_{10}O_5)_n$. CeNF is made from pulp or the like as a raw material and is obtained by micronizing the cellulose fibers contained in the pulp or the like to a nanometer size. For example, the product obtained by hydrolyzing pulp can be used as cellulose nanofiber. The portion where the molecular chains of cellulose are densely and regularly present is sometimes referred to as crystalline cellulose.

The shape of the powdered cellulose fiber constituting the cellulose nanofiber is not limited, and for example, the powdered cellulose fiber having an elongated particle shape or a substantially spherical shape can be used.

Cellulose nanofiber is lightweight, has high strength, and has heat resistance. Therefore, by adding it to the raw material resin, the strength and heat resistance of the ultrafine fiber and the ultrafine fiber non-woven fabric can be improved. Cellulose may be nano-sized by a defibering treatment (micronizing treatment). The defibering treatment includes a chemical treatment method and a mechanical treatment method. These methods may be used in combination. By such a defibering treatment (micronizing treatment), the fiber length and the fiber diameter can be reduced.

The cellulose nanofiber (CeNF) to be added to the raw material resin preferably has a fiber length (L) of 0.5 μm or more and 10 μm or less and a fiber diameter (R) of 0.001 μm or more and 10 μm or less. Also, it is preferable that the fiber length (L) and the fiber diameter (R) are smaller than at least the ultrafine fiber diameter R.

By adding the cellulose nanofiber (CeNF) described above to the raw material resin, the ultrafine fiber to be formed becomes finer and more uniform. It is conceivable that this is because the hydroxyl group (—OH) of cellulose is a polar group, so that the fiber is easily attracted by the electrostatic force of the collector 6 and becomes finer and more uniform, that is, the stretching effect is increased.

As described above, by adding a polar filler (filler having a polar group) such as CeNF to the raw material resin, the fiber diameter of the ultrafine fiber obtained by the LES method can be made finer and more uniform. Further, the pore diameter of the ultrafine fiber non-woven fabric obtained by the LES method can be made finer and more uniform.

In the above description, cellulose nanofiber (CeNF) has been described as an example, but cellulose nanocrystal and cellulose nanowhisker may be used. Cellulose nanofiber, cellulose nanocrystal, and cellulose nanowhisker are referred to as nanocellulose.

<Method of Fabricating Solid Electrolyte Membrane Using Ultrafine Fiber Non-Woven Fabric>

Figure 2:
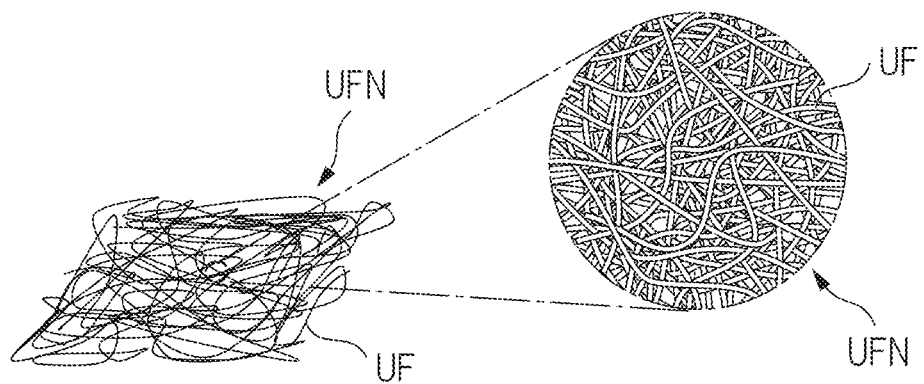
FIG. 2 is a diagram showing a manufacturing process of a solid electrolyte membrane according to the embodiment.
Figure 2:
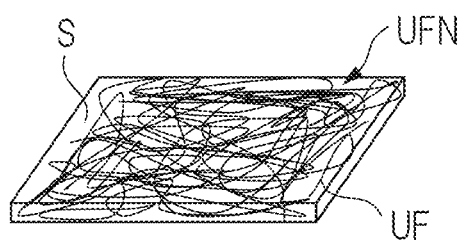
Figure 2:
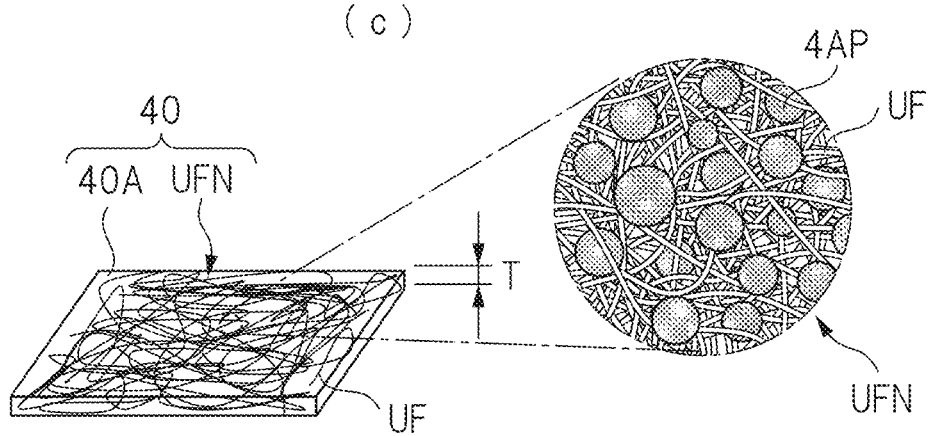

FIG. 2 is a diagram showing a manufacturing process of a solid electrolyte membrane according to the present embodiment. A solid electrolyte membrane is formed using the ultrafine fiber non-woven fabric obtained by the above-described <Method of fabricating ultrafine fiber non-woven fabric>.

First, the ultrafine fiber non-woven fabric UFN shown in FIG. 2(a) and the slurry S containing the solid electrolyte material (solid electrolyte particles 4AP) are prepared. The slurry S is obtained by dispersing a solid electrolyte material in a liquid (solvent, dispersion medium). If necessary, a binder or the like may be added. Next, as shown in FIG. 2(b), the slurry S containing the solid electrolyte material is applied onto the ultrafine fiber non-woven fabric UFN. Next, as shown in FIG. 2(c), by heating the slurry S while pressurizing it, the liquid component of the slurry S is vaporized and the solid electrolyte material (solid electrolyte particles 4AP) is embedded (filled) into the fine pores of the ultrafine fiber non-woven fabric. In this way, it is possible to form the solid electrolyte membrane 40 in which the solid electrolyte material (solid electrolyte particles 4AP) is incorporated in the fine pores of the ultrafine fiber non-woven fabric UFN in which the ultrafine fibers UF are mutually entwined to be laminated (FIG. 2(c)). As described above, the solid electrolyte membrane 40 can be formed by a simple process and at low cost. Note that the solid electrolyte material after the liquid component has been removed is denoted by "40A". Further, the process of removing the liquid component of the slurry S (drying process) and the process of pressurizing the solid electrolyte material (solid electrolyte particles 4AP) may be separately performed.

Figure 3:
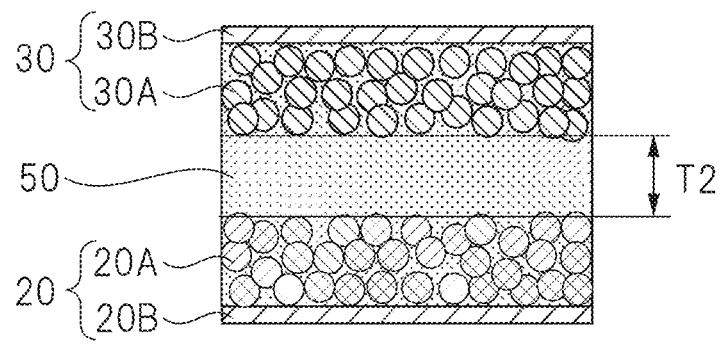
FIG. 3 is a cross-sectional view schematically showing a configuration of an all-solid-state battery according to a comparative example.
Figure 4:
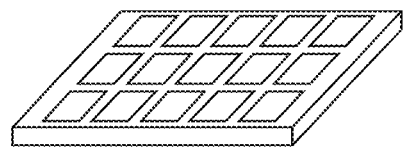
FIG. 4 is a diagram showing a manufacturing process of a solid electrolyte sheet of the all-solid-state battery according to the comparative example.
Figure 4:
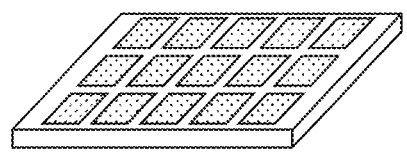
Figure 4:
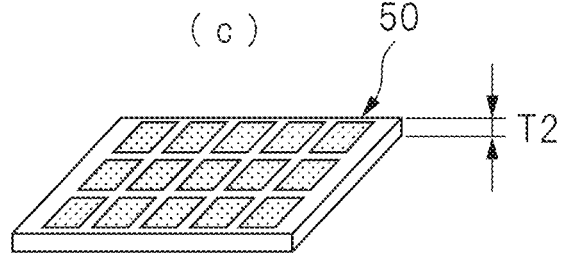

FIG. 3 is a cross-sectional view schematically showing a configuration of an all-solid-state battery according to a comparative example. Also, FIG. 4 is a diagram showing a manufacturing process of a solid electrolyte sheet of the all-solid-state battery according to the comparative example. For example, in the comparative example shown in FIG. 3 and FIG. 4, a solid electrolyte sheet (thickness: 37 to 138 μm) is fabricated by filling a solid electrolyte into a polyimide sheet-like support (FIG. 4(a)) in which a plurality of through holes having a square shape with a side of 200 to 800 μm processed by a photoetching method is formed (FIG. 4(b)), and then heating and pressurizing the support with a press machine (FIG. 4(c)).

In the case of the comparative example described above, each hole has a square shape with a side of 200 to 800 μm, and there is a limitation in the opening ratio. Namely, when the opening ratio is increased, the contact area between the solid electrolyte and the positive and negative electrodes can be increased, but there is a concern that the solid electrolyte material may fall off or collapse. Further, the thickness of the sheet (T2) is as large as 37 to 138 μm. On the other hand, in the present embodiment, the film thickness (T) of the solid electrolyte membrane 40 can be easily adjusted, and the film thickness can be set to, for example, 20 μm or less. In the LES method, the characteristics (thickness, fiber diameter, pore diameter, etc.) of the ultrafine fiber non-woven fabric can be easily adjusted by adjusting the processing conditions (applied voltage, distance between the nozzle and the laser irradiation unit, processing time, etc.). In particular, the volume ratio of the non-woven fabric serving as the support to the solid electrolyte membrane can be suppressed, and can be set to, for example, 10 vol % or more and 30 vol % or less.

As described above, in the present embodiment, the characteristics of the solid electrolyte membrane can be improved.

EXAMPLE

Example 1

In this example, a fiber web (also referred to as non-woven fabric, fiber bundle, or fiber sheet) of HDPE was fabricated by the laser electrospinning (LES) method. As the LES apparatus, an electrospinning (ES) apparatus manufactured by Kato Tech Co., Ltd. and a carbon dioxide laser generator (PIN-30R) manufactured by Onizuka Glass Co., Ltd were used in combination. As the needle for sending out the fiber, a needle of 20 G standard was used, and this was used as the nozzle. The LES apparatus was covered with an enclosure box made of acrylic resin, and the atmosphere inside the enclosure box was maintained at a humidity of 10 to 30% RH by supplying dry air. In this way, it was possible to eliminate the influence of humidity during fiber formation.

The wavelength of the $CO_2$ laser beam was 10.6 μm, and the laser beam horizontally emitted from the apparatus was reflected by a mirror and the raw material resin directly below the mirror was irradiated with the laser beam. The cross-section of the laser beam at the time of emission was circular with a fiber diameter of 6 mm, and it was converted by a beam shape conversion element (expander) so as to have 2.1 mm in a fiber axis direction and 13 mm in a direction horizontal to the fiber axis at the irradiation portion. Also, the irradiation diameter of the laser beam was set to about 1.1 mm in the fiber axis direction and about 8.0 mm in the vertical direction by using a slit.

The diameter of the raw material resin (fibrous) was about 0.5 mm, the distance between the nozzle and the collector was 80 mm, the distance from the nozzle to the central axis of the laser beam was 0.7 mm, and the sending speed was 40 mm/min. A roller (no rotation, traverse speed: 2 mm/sec) was used as a fiber collector (collection plate), and the fiber web of HDPE was fabricated by changing the laser output to 11 to 16 W and changing the applied voltage to 11 to 24 kV.

Figure 6:
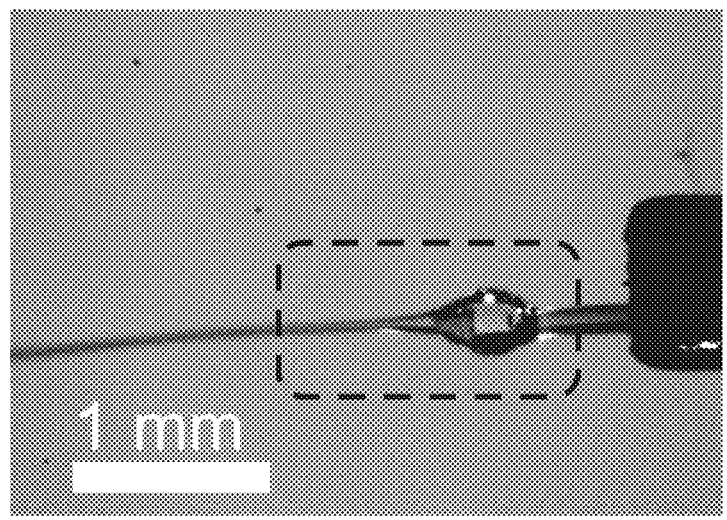
FIG. 6 is a diagram (photograph) showing a state of a nozzle tip at the time of forming a fiber web of HDPE.
Figure 7:
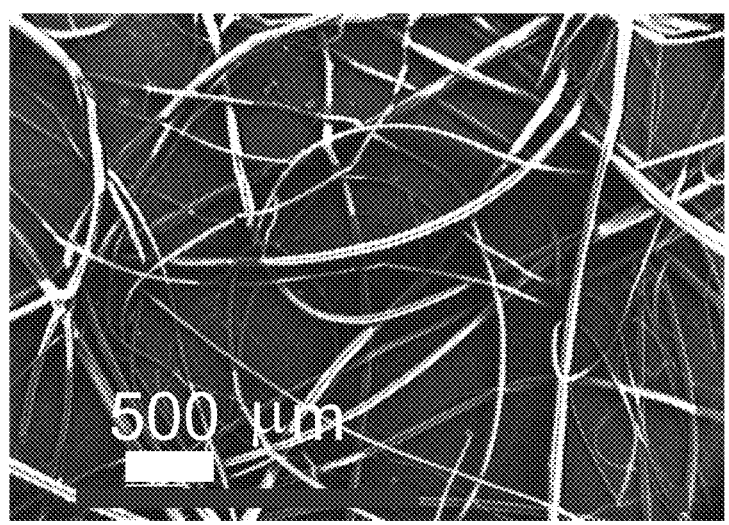
FIG. 7 is a SEM photograph of the fiber web of HDPE.

FIG. 6 is a diagram (photograph) showing a state of a nozzle tip at the time of forming the fiber web of HDPE. FIG. 7 is a SEM photograph of the fiber web of HDPE. Morphological observation was performed using SEM (KYENCE, VE-7800). Prior to the observation, gold evaporation was performed by ion sputter (E-1010 manufactured by Hitachi, Ltd.) so as to enable the SEM observation. In the observation, the distance between two points in the fiber diameter direction was defined as one point for each fiber in the obtained SEM image, and the fiber diameter was obtained by measuring a total of 100 points by using the image analysis software ImageJ. The fiber diameter was a dozen μm or more.

Example 2

In this example, a fiber web of CeNF-added HDPE was fabricated by the laser electrospinning (LES) method. HDPE added with CeNF was used as a raw material resin, and the fiber web was fabricated in the same manner as in Example 1. The amount of CeNF added to HDPE was 1 vol % (CeNF: 1 vol %, HDPE: 99 vol %), and CEOLUS FD101 (manufactured by Asahi Kasei Chemicals Co., Ltd.) was used as CeNF.

Figure 8:
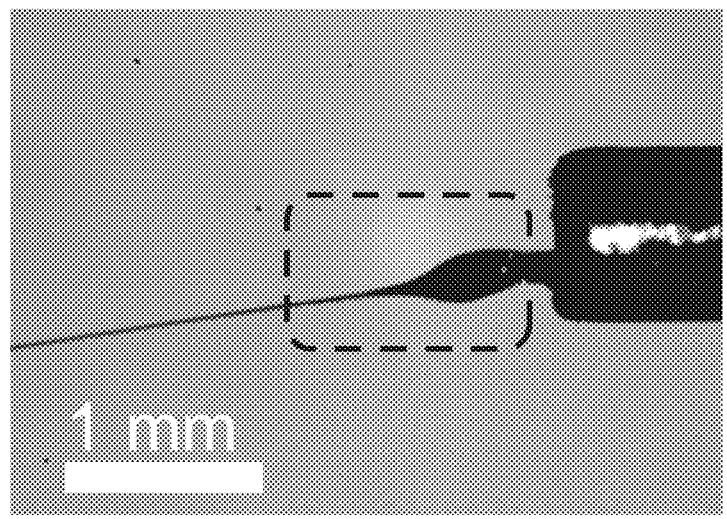
FIG. 8 is a diagram (photograph) showing a state of a nozzle tip at the time of forming a fiber web of CeNF-added HDPE.
Figure 9:
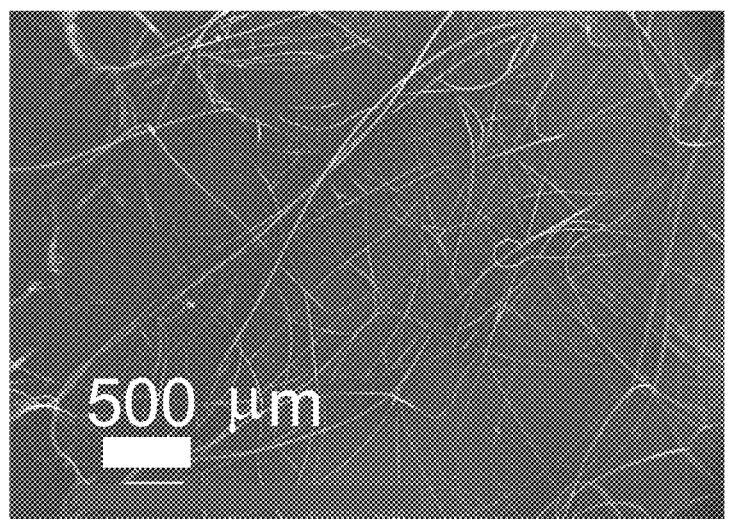
FIG. 9 is a SEM photograph of the fiber web of CeNF-added HDPE.

FIG. 8 is a diagram (photograph) showing a state of a nozzle tip at the time of forming the fiber web of CeNF-added HDPE. FIG. 9 is a SEM photograph of the fiber web of CeNF-added HDPE. The fiber diameter of the fiber web of CeNF-added HDPE was 5 μm or less (about 4 μm).

In this example, as compared with the case of Example 1 in which CeNF was not added, the fiber could be smoothly stretched, the fiber spinning was stable, the fiber diameter was reduced, and the fiber web with uniform thickness was obtained.

[Method of Fabricating all-Solid-State Battery]

Figure 10:
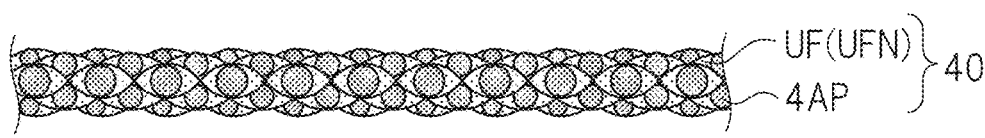
FIG. 10 is a cross-sectional view showing a manufacturing process of an all-solid-state battery.
Figure 10:
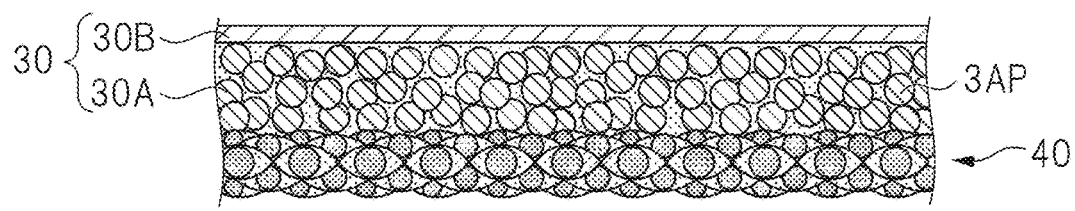
Figure 10:
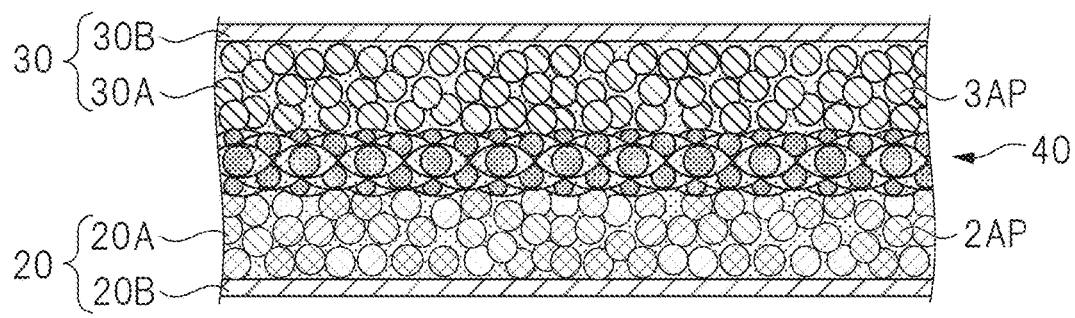

The method of fabricating the all-solid-state battery described with reference to FIG. 1 is not limited, and for example, the all-solid-state battery can be manufactured as follows. FIG. 10 is a cross-sectional view showing a manufacturing process of an all-solid-state battery.

The solid electrolyte membrane 40 in which the solid electrolyte particles 4AP are incorporated between the ultrafine fibers UF (FIG. 10(a)) is formed based on the above-mentioned [Method of fabricating solid electrolyte membrane].

Next, a mixture of the positive electrode active material 3AP and the solid electrolyte material is mounted on the upper surface side (positive electrode side) of the solid electrolyte membrane 40, the positive electrode current collector 30B is mounted thereon, and then, they are pressurized (pressed). In this way, the positive electrode (positive electrode mixture layer 30A and positive electrode current collector 30B) is formed on the upper surface of the solid electrolyte membrane 40 (FIG. 10(b)).

Next, with the lower surface side (negative electrode side) of the solid electrolyte membrane 40 facing upward, a mixture of the negative electrode active material 2AP and the solid electrolyte material is mounted, the negative electrode current collector 20B is mounted thereon, and then, they are pressurized (pressed). In this way, the negative electrode (negative electrode mixture layer 20A and negative electrode current collector 20B) is formed on the lower surface side (negative electrode side) of the solid electrolyte membrane 40 (FIG. 10(c)).

Consequently, an electrode group composed of the positive electrode current collector 30B, the positive electrode mixture layer 30A, the solid electrolyte membrane 40, the negative electrode mixture layer 20A, and the negative electrode current collector 20B is formed.

Thereafter, for example, the all-solid-state battery can be formed by inserting the electrode group into the battery case and sealing the battery case.

Note that the pressurizing process may be performed at once after the positive electrode active material 3AP and the like, the solid electrolyte membrane 40, the negative electrode active material 2AP and the like, and the negative electrode current collector 20B are sequentially stacked on the positive electrode current collector 30B.

[Operation of all-Solid-State Battery]

In the above-mentioned all-solid-state battery, lithium ions are desorbed from the positive electrode active material 3AP of the positive electrode mixture layer 30A during the charging process, and lithium ions desorbed from the negative electrode active material 2AP of the negative electrode mixture layer 20A are inserted during the discharging process. In this way, charging and discharging can be performed by inserting and desorbing lithium ions.

As described above, by manufacturing an all-solid-state battery using the solid electrolyte membrane 40 in which the solid electrolyte material (particles) is incorporated in the ultrafine fiber non-woven fabric UFN used as a support, it is possible to manufacture an all-solid-state battery having favorable characteristics. Specifically, as described above, by supporting (fixing) the solid electrolyte material, which is fine particles, with the ultrafine fiber UF, the ratio of the solid electrolyte material in the solid electrolyte membrane 40 can be increased, and the occupied area (exposed area) of the solid electrolyte material on the surface of the membrane can be increased. As a result, the contact area between the solid electrolyte membrane 40 and the positive and negative electrodes (positive and negative electrode active materials) can be improved, and the characteristics (output characteristics, charge/discharge characteristics) of the all-solid-state battery can be improved. Further, by supporting (fixing) the solid electrolyte material, which is fine particles, with the ultrafine fiber UF, the film thickness of the solid electrolyte membrane 40 can be reduced and the resistance between the positive electrode and the negative electrode can be reduced, so that the characteristics (output characteristics, charge/discharge characteristics) of the all-solid-state battery can be improved.

In the foregoing, the invention made by the inventors of the present invention has been concretely described based on the embodiments and examples. However, it is needless to say that the present invention is not limited to the foregoing embodiments and examples and various modifications can be made within the range not departing from the gist thereof.

For example, a secondary battery has been described as an example of a lithium battery, but the present invention can be applied also to a primary battery. Also, a lithium battery has been described as an example, but the present invention can be applied also to other all-solid-state batteries. Further, CeNF having hydroxyl group (—OH) has been described as an example of a polar filler, but other fillers having a polar group may be used. Both an organic filler and an inorganic filler may be used as the filler.

REFERENCE SIGNS LIST

1 raw material resin
2 roller
2AP negative electrode active material
3 nozzle
3AP positive electrode active material
4AP solid electrolyte particle
5 high voltage generation source
6 collector
7 ground potential
8 laser irradiation unit
9 slit
10 laser
20 negative electrode
20A negative electrode mixture layer
20B negative electrode current collector
30 positive electrode
30A positive electrode mixture layer
30B positive electrode current collector
40 solid electrolyte membrane
S slurry
UF ultrafine fiber
UFN ultrafine fiber non-woven fabric (non-woven fabric)

The invention claimed is:

1. A solid electrolyte membrane including a non-woven fabric serving as a support and a solid electrolyte serving as a matrix component,
    wherein the non-woven fabric is composed of a plurality of ultrafine fibers,
    wherein each of the plurality of ultrafine fibers is added with cellulose nanofiber,
    wherein an amount of the cellulose nanofiber added to a raw material resin constituting each of the plurality of ultrafine fibers is 0.1% by volume or more and less than 10% by volume,
    wherein each of the plurality of ultrafine fibers has a fiber diameter of 1 μm or less,
    wherein a fiber diameter of the cellulose nanofiber is smaller than the fiber diameter of each of the plurality of ultrafine fibers, and
    wherein a length of the cellulose nanofiber is smaller than a length of each of the plurality of ultrafine fibers.

2. The solid electrolyte membrane according to claim 1, wherein the fiber diameter of the cellulose nanofiber is 0.001 μm or more and less than 1 μm, and
    wherein the length of the cellulose nanofibers is 0.5 μm or more and 10 μm or less.

* * * * *